United States Patent
Yamazaki et al.

(10) Patent No.: US 7,505,655 B2
(45) Date of Patent: Mar. 17, 2009

(54) WHITE LIGHT-EMITTING DEVICE USING FLUORESCENT FIBER

(75) Inventors: Masaaki Yamazaki, Saitama (JP); Osamu Ishii, Saitama (JP); Naruhito Sawanobori, Saitama (JP); Shinobu Nagahama, Saitama (JP)

(73) Assignee: Sumita Optical Glass, Inc. (JP)

( * ) Notice: Subject to any disclaimer, the term of this patent is extended or adjusted under 35 U.S.C. 154(b) by 0 days.

(21) Appl. No.: 11/761,075

(22) Filed: Jun. 11, 2007

(65) Prior Publication Data

US 2007/0229938 A1    Oct. 4, 2007

Related U.S. Application Data

(62) Division of application No. 11/456,168, filed on Jul. 7, 2006, now Pat. No. 7,277,618.

(30) Foreign Application Priority Data

Nov. 30, 2005  (JP) .............................. 2005-346840

(51) Int. Cl.
  *G02B 6/02*  (2006.01)
(52) U.S. Cl. ........................ 385/123; 385/124; 385/127
(58) Field of Classification Search ................. 385/123, 385/124, 127
  See application file for complete search history.

(56) References Cited

U.S. PATENT DOCUMENTS

| | | | | |
|---|---|---|---|---|
| 6,270,244 | B1 * | 8/2001 | Naum ........................ | 362/583 |
| 6,272,269 | B1 * | 8/2001 | Naum ........................ | 385/43 |
| 6,363,088 | B1 * | 3/2002 | Alphonse et al. ............... | 372/6 |
| 6,490,082 | B2 * | 12/2002 | Choi et al. ................... | 359/343 |
| 2001/0022566 | A1 | 9/2001 | Okazaki | |
| 2005/0194604 | A1 | 9/2005 | Sakuma et al. | |
| 2005/0256516 | A1 * | 11/2005 | Boutoussov ................. | 606/16 |
| 2006/0113885 | A1 * | 6/2006 | Iimura ........................ | 313/485 |
| 2006/0275016 | A1 * | 12/2006 | Boutoussov et al. ........ | 385/147 |

(Continued)

FOREIGN PATENT DOCUMENTS

JP    S49(1974)-16443  A1    2/1974

(Continued)

OTHER PUBLICATIONS

Notice of Reasons for Rejection for Japanese counterpart application with English Translation (6 pages).

*Primary Examiner*—K. Cyrus Kianni
(74) *Attorney, Agent, or Firm*—James B. Conte; HBSWK

(57) ABSTRACT

A white light-emitting device using a fluorescent fiber includes a blue semiconductor light-emitting element (2) for emitting an excitation light (a), and an optical fiber (3) having one side end face and the other side end face, the excitation light (a) emitted from the blue semiconductor light-emitting element (2) being made incident to the one side end face to be guided to the other side end face. The optical fiber (3) includes a core containing therein a phosphor for emitting wavelength conversion lights by being excited by the excitation light (a) received from the blue semiconductor light-emitting element (2), and a cladding member (3B) having a light emission surface in its peripheral surface, at least a part of optically multiplexed lights, which are obtained by optically multiplexing the wavelength conversion lights and the excitation light, being emitted through the light emission surface.

6 Claims, 5 Drawing Sheets

U.S. PATENT DOCUMENTS

2007/0229938 A1 * 10/2007 Yamazaki et al. ........... 359/326

FOREIGN PATENT DOCUMENTS

| JP | U-H04(1992)-35102 A1 | 3/1992 |
| JP | 11-281819 | 10/1999 |
| JP | 2000-275444 | 10/2000 |
| JP | 2001-264662 | 9/2001 |
| JP | 2005-205195 | 8/2005 |
| JP | 2005-286312 | 10/2005 |
| JP | 2006-071776 | 3/2006 |
| WO | WO 99/45316 | 9/1999 |

* cited by examiner

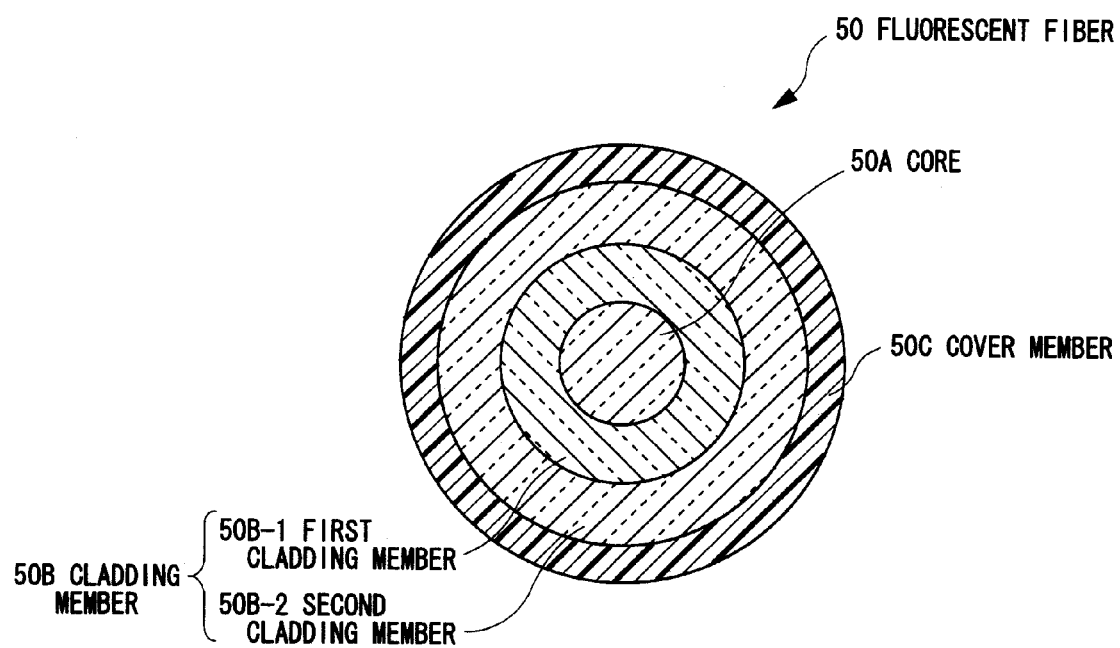

WHITE LIGHT-EMITTING DEVICE USING FLUORESCENT FIBER

The present application is a Divisional Application of our U.S. application Ser. No. 11/456,167 filed on Jul. 7, 2006 and is based on Japanese patent application No. 2005-346840, the entire contents of which are incorporated herein by reference.

BACKGROUND OF THE INVENTION

1. Field of the Invention

The present invention relates to a white light-emitting device using a fluorescent fiber, and more particularly to a white light-emitting device, using a fluorescent fiber, which is suitable for being used as various kinds of a light source for a backlight for a liquid crystal television, and a light source including a neon tube.

2. Description of Related Art

In recent years, a light-emitting device using a semiconductor light-emitting element such as a light-emitting diode (LED) element or a light amplification by stimulated emission of radiation (LASER) element has been widely utilized as various kinds of a light source because it is advantageous in miniaturization, an excellent power efficiency, and a long life as compared with the case of an incandescent lamp.

Heretofore, a light source including a semiconductor light-emitting element for emitting an excitation light, a wavelength-converting member containing therein a phosphor material for emitting wavelength conversion lights by receiving the excitation light emitted from the semiconductor light-emitting element, and an optical fiber for guiding the excitation light to the wavelength-converting member has been known as this sort of a light source. This light source, for example, is disclosed in the Japanese Patent Kokai No. 2005-205195.

In such a light source, when the excitation light emitted from the semiconductor light-emitting element reaches the wavelength-converting member through the optical fiber, the phosphor material receives a part of the excitation light to make the wavelength conversion, thereby emitting wavelength conversion lights each having a predetermined wavelength range within the wavelength-converting member. The resulting wavelength conversion lights and the excitation light emitted from the semiconductor light-emitting element are then optically multiplexed to be radiated in the form of an illuminating light to the outside.

However, in the case of the light source disclosed in the Japanese Patent Kokai No. 2005-205195, the wavelength-converting member is connected to a light emission side end face of the optical fiber. As a result, there is encountered such a problem that an optical coupling loss is generated between the optical fiber and the wavelength-converting member, and thus an efficiency of utilizing the light is reduced.

SUMMARY OF THE INVENTION

In the light of the foregoing, it is an object of the present invention to provide a white light-emitting device, using a fluorescent fiber, in which generation of an optical coupling loss can be suppressed, and thus an efficiency of utilizing a light can be enhanced.

In order to attain the above-mentioned object, according to one aspect of the present invention, there is provided a white light-emitting device using a fluorescent fiber, including: a blue semiconductor light-emitting element for emitting an excitation light; and an optical fiber having a first side end face and a second side end face, the excitation light emitted from the blue semiconductor light-emitting element being made incident to the first side end face to be guided to the second side end face, the optical fiber including: a core containing therein a phosphor for emitting wavelength conversion lights by being excited by the excitation light supplied from the blue semiconductor light-emitting element; and a cladding member having a light emission surface in its peripheral surface, at least a part of optically multiplexed lights, which are obtained by optically multiplexing the wavelength conversion lights and the excitation light, being emitted through the light emission surface.

In order to attain the above-mentioned object, according to another aspect of the present invention, there is provided a white light-emitting device using a fluorescent fiber, including: a blue semiconductor light-emitting element for emitting an excitation light; and an optical fiber having a first side end face and a second side end face, the excitation light emitted from the blue semiconductor light-emitting element being made incident to the first side end face to be guided to the second side end face, the optical fiber including: a core including a low phonon glass containing therein at least praseodymium ions, as trivalent rare earth ions, for emitting wavelength conversion lights by being excited by the excitation light; and a cladding member having a light emission surface in its peripheral surface, at least a part of optically multiplexed lights, which are obtained by optically multiplexing the wavelength conversion lights and the excitation light, being emitted through the light emission surface.

In order to attain the above-mentioned object, according to still another aspect of the present invention, there is provided a white light-emitting device using a fluorescent fiber, including: a blue semiconductor light-emitting element for emitting an excitation light; and an optical fiber having a first side end face and a second side end face, the excitation light emitted from the blue semiconductor light-emitting element being made incident to the first side end face to be guided to the second side end face, the optical fiber including: a core including a low phonon glass containing therein a phosphor for emitting wavelength conversion lights by being excited by an excitation light having a wavelength falling within a range of 430 to 490 nm as the excitation light; and a cladding member having a light emission surface in its peripheral surface, at least a part of optically multiplexed lights, which are obtained by optically multiplexing the wavelength conversion lights and the excitation light, being emitted through the light emission surface.

According to the present invention, the generation of the optical coupling loss can be suppressed, and thus the efficiency of utilizing the light can be enhanced.

BRIEF DESCRIPTION OF THE DRAWINGS

FIG. 5 is a cross sectional view for explaining a fluorescent fiber of a white light-emitting device using a fluorescent fiber according to a second embodiment of the present invention.

DETAILED DESCRIPTION OF PREFERRED EMBODIMENTS

First Embodiment

Figure 1:
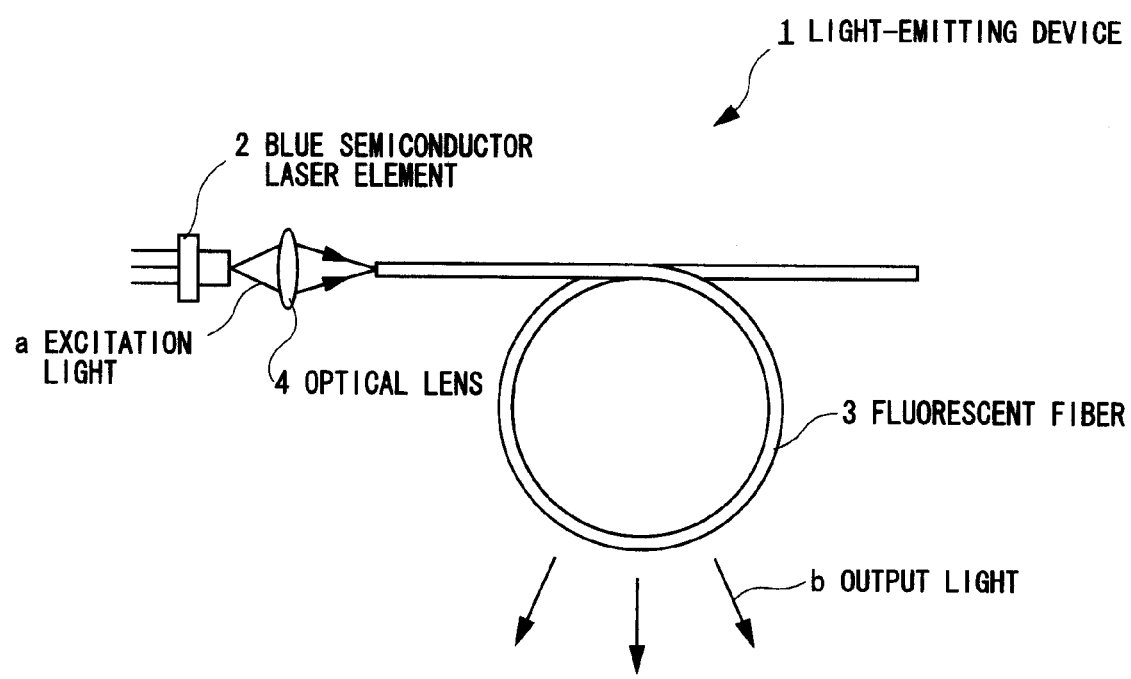
FIG. 1 is a plan view for explaining a white light-emitting device using a fluorescent fiber according to a first embodiment of the present invention.
Figure 2:
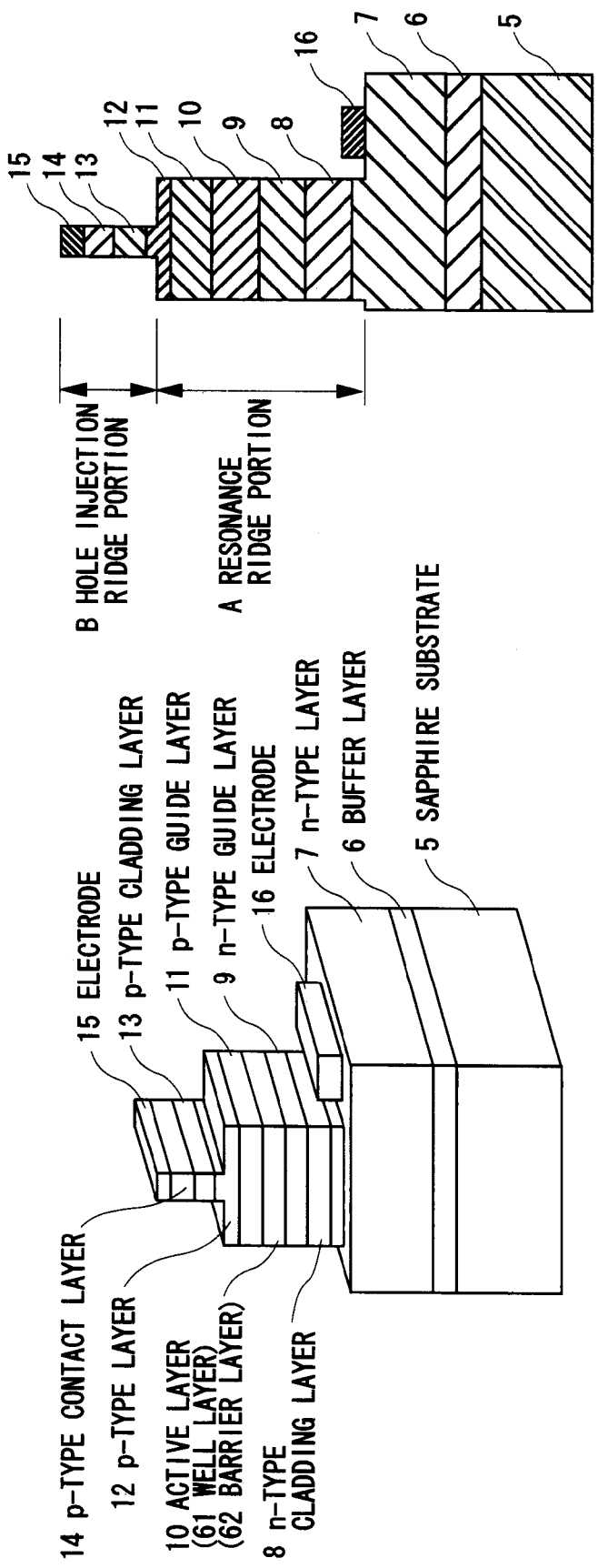
FIGS. 2A and 2B are respectively a perspective view and a cross sectional view for explaining a blue semiconductor laser element of the light-emitting device according to the first embodiment of the present invention.
Figure 3:
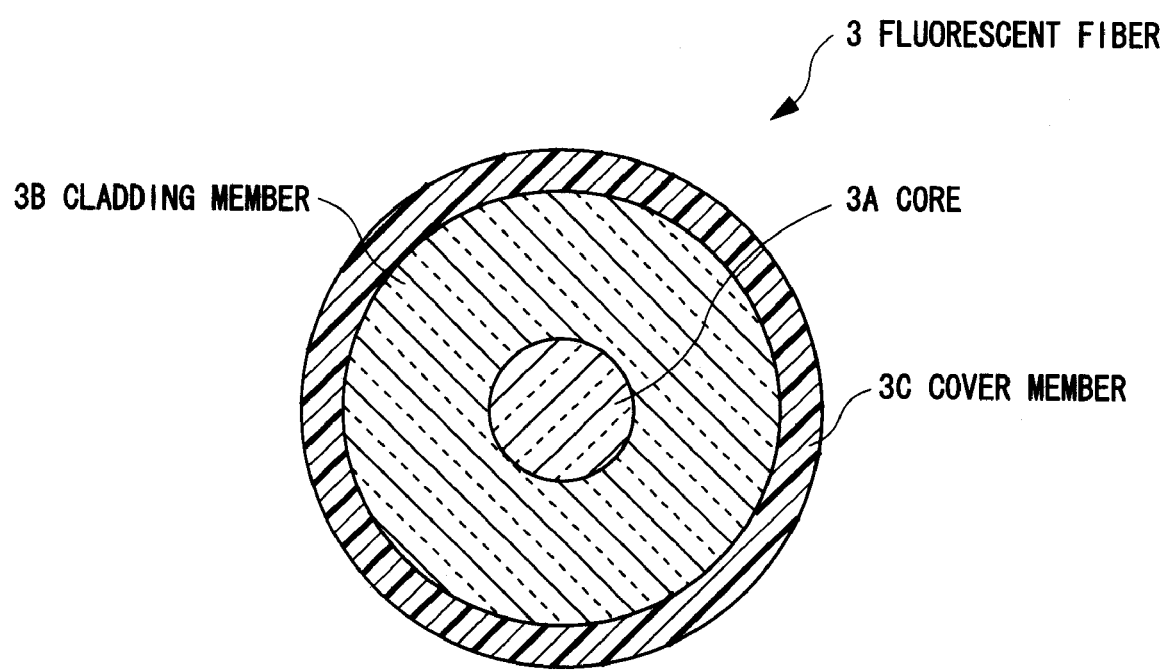
FIG. 3 is a cross sectional view for explaining the fluorescent fiber of the light-emitting device according to the first embodiment of the present invention.

FIG. 1 is a plan view for explaining a white light-emitting device using a fluorescent fiber according to a first embodiment of the present invention, FIGS. 2A and 2B are respectively a perspective view and a cross sectional view for explaining a blue semiconductor laser element of the light-emitting device according to the first embodiment of the present invention, and FIG. 3 is a cross sectional view for explaining the fluorescent fiber of the white light-emitting device using a fluorescent fiber according to the first embodiment of the present invention.

[Overall Construction of Light-Emitting Device 1]

Referring to FIG. 1, a light-emitting device 1 roughly includes a blue semiconductor laser element 2 as an excitation light source, a fluorescent fiber 3 through which optically multiplexed lights obtained by optically multiplexing an excitation light (blue light) "a" radiated from the blue semiconductor laser element 2, and wavelength conversion lights obtained through wavelength conversion by the excitation light "a" are emitted in the form of an illuminating light (white light) to the outside, and an optical lens 4 interposed between the fluorescent fiber 3 and the blue semiconductor laser element 2.

[Structure of Blue Semiconductor Laser Element 2]

As shown in FIGS. 2A and 2B, the blue semiconductor laser element 2 has a sapphire substrate 5, a resonance ridge portion A, and a hole injection ridge portion B, and serves to emit a blue light having a wavelength of 442 nm as the excitation light "a". A buffer layer 6 which has a thickness of about 50 nm and which is made of aluminum nitride (AlN) is formed on the sapphire substrate 5. At that, GaN, GaInN or AlGaN may also be used as the material for the buffer layer 6.

An n-type layer 7 which has a thickness of about 4.0 μm and which is made of a silicon (Si)-doped GaN having an electron concentration of $1 \times 10^{18}$ cm$^{-3}$, an n-type cladding layer 8 which has a thickness of about 500 nm and which is made of Si-doped Al$_{0.1}$Ga$_{0.9}$N having an electron concentration of $1 \times 10^{18}$ cm$^{-3}$, an n-type guide layer 9 which has a thickness of 100 nm and which is made of a Si-doped GaN having an electron concentration of $1 \times 10^{18}$ cm$^{-3}$, and an active layer 10 having a multi-quantum well (MQW) structure in which a barrier layer 62 which has a thickness of about 35 Å and which is made of GaN, and a well layer 61 which has a thickness of about 35 Å and which is made of Ga$_{0.95}$In$_{0.05}$N are alternately deposited are formed in this order on the buffer layer 6.

A p-type guide layer 11 which has a thickness of about 100 nm and which is made of magnesium (Mg)-doped GaN having a hole concentration of $5 \times 10^{17}$ cm$^{-3}$, a p-type layer 12 which has a thickness of about 50 nm and which is made of Mg-doped Al$_{0.25}$Ga$_{0.75}$N having a hole concentration of $5 \times 10^{17}$ cm$^{-3}$, a p-type cladding layer 13 which has a thickness of about 500 nm and which is made of Mg-doped Al$_{0.1}$Ga$_{0.9}$N having a hole concentration of $5 \times 10^{17}$ cm$^{-3}$, and a p-type contact layer 14 which has a thickness of about 200 nm and which is made of Mg-doped GaN having a hole concentration of $5 \times 10^{17}$ cm$^{-3}$ are formed in this order on the active layer 10. At that, AlGaN or GaInN may also be used as the material for the p-type contact layer 14.

An electrode 15 which has a width of 5 μm and which is made of nickel (Ni) is formed on the p-type contact layer 14. In addition, an electrode 16 made of aluminum (Al) is formed on the n-type layer 7.

The resonance ridge portion A includes the n-type cladding layer 8, the n-type guide layer 9, the active layer 10, the p-type guide layer 11, and the p-type layer 12. In addition, the hole injection ridge portion B includes the p-type cladding layer 13, the p-type contact layer 14, and the electrode 15.

[Construction of Fluorescent Fiber 3]

As shown in FIG. 3, the fluorescent fiber 3 has a core 3A and a cladding member 3B, and is optically connected to the blue semiconductor laser element 2 through the optical lens 4 (shown in FIG. 1). The blue light a emitted from the blue semiconductor laser element 2 is made incident to one side end face (incidence face) of the fluorescent fiber 3, so that a part of the blue light "a" is guided to the other side end face (emission face) of the fluorescent fiber 3 as it is, and for example, blue, green and red wavelength conversion lights which are obtained through the wavelength conversion of a part of the blue light a are guided to the other side end face of the fluorescent fiber 3, respectively. In addition, optically multiplexed lights obtained by optically multiplexing these wavelength conversion lights and the excitation light "a" are emitted in the form of an illuminating light (white light) through a fiber peripheral surface (a peripheral surface of the cladding member 3B) to the outside. The fluorescent fiber 3 is made of a fluorescent glass which does not contain therein any of ZrF$_4$, HfF$_4$, ThF$_4$ and the like, but contains therein AlF$_3$ as a main constituent. Thus, the stable glass is obtained which is transparent for a light range from a visible range to an infrared range, and has the excellent chemical durability and the large mechanical strength. This sort of glass has such an advantage essential to the fluorescent glass that the phonon energy is less.

A fiber length of the fluorescent fiber 3 is set to such a size of about 100 nm that all the excitation light "a" emitted from the blue semiconductor laser element 2 is not emitted through the light emission side end face, but the blue, green and red lights obtained through the wavelength conversion by the excitation light "a" are emitted through the light emission side end face, respectively.

The core 3A is formed of a wavelength-converting member including a low phonon glass such as an infrared radiation transmissive fluorescent glass containing therein at least praseodymium ions (Pr$^{3+}$) as trivalent rare earth ions by about 3,000 ppm. Also, the core 3A serves to emit the green, orange and red wavelength conversion lights by being excited by a part of the excitation light (blue light) a emitted from the blue semiconductor laser element 2. Trivalent ions of terbium can be added to the core 3A for green color adjustment, and trivalent ions of erbium or holmium can be added to the core 3A for green and red color adjustment. As a result, the color adjustment can be performed. A core diameter of the core 3A is set to a size of about 4 μm. At that, in addition to the infrared radiation transmissive fluorescent glass, a heavy metal oxide glass is used as the low phonon glass.

The cladding member 3B is formed in the periphery of the core 3A, and the overall cladding member 3B is made of a glass or a transparent resin. A refractive index n1 of the cladding member 3B is set to smaller one (n1≈1.45) than that n2 (n2≈1.5) of the core 3A. A cladding diameter (an outer diameter of the fluorescent fiber 3) of the cladding member 3B is set to a size of about 200 μm. A peripheral surface of the cladding member 3B is covered with a cover member 3C made of a light-transmissive resin. The cover member 3C can be colored for the color adjustment.

[Structure of Optical Lens 4]

The optical lens 4 is constituted by a double-convex lens, and is disposed between the blue semiconductor laser element 2 and the fluorescent fiber 3 in the manner as described above. Also, the optical lens 4 serves to condense the excitation light "a" emitted from the blue semiconductor laser element 2 to a portion (the core 3A) located in the light incidence side end face of the fluorescent fiber 3.

[Operation of Light-Emitting Device 1]

Firstly, when a suitable voltage is applied from a power source to the blue semiconductor laser element 2, the active layer 10 of the blue semiconductor laser element 2 emits the blue light "a", and the blue light "a" is radiated to the optical lens 4 side. The blue light "a" emitted from the blue semiconductor laser element 2 is then made incident to the fluorescent fiber 3 through the optical lens 4. In the fluorescent fiber 3, a part of the blue light "a" is then made incident from the light incidence end face to the core 3A, and is guided to the light emission end face of the core 3A while total reflection thereof is repeatedly made within the core 3A. In this case, the blue light "a" excites the praseodymium ions within the core 3A, whereby the blue, green and red wavelength conversion lights are emitted, respectively. After that, the optically multiplexed lights (white light) obtained by optically multiplexing the excitation light "a", and the blue, green and red wavelength conversion lights penetrate the fluorescent fiber 3 (the core 3A and the cladding member 3B). As a result, the optically multiplexed lights from the excitation light "a", and the blue, green and red wavelength conversion lights are emitted in the form of an output light "b" through the peripheral surface of the cladding member 3B (the cover member 3C) to the outside of the fluorescent fiber 3.

Next, a description will be given with respect to the results of an experiment of observing the output light "b" emitted from the light-emitting device 1 according to this embodiment of the present invention.

Figure 4:
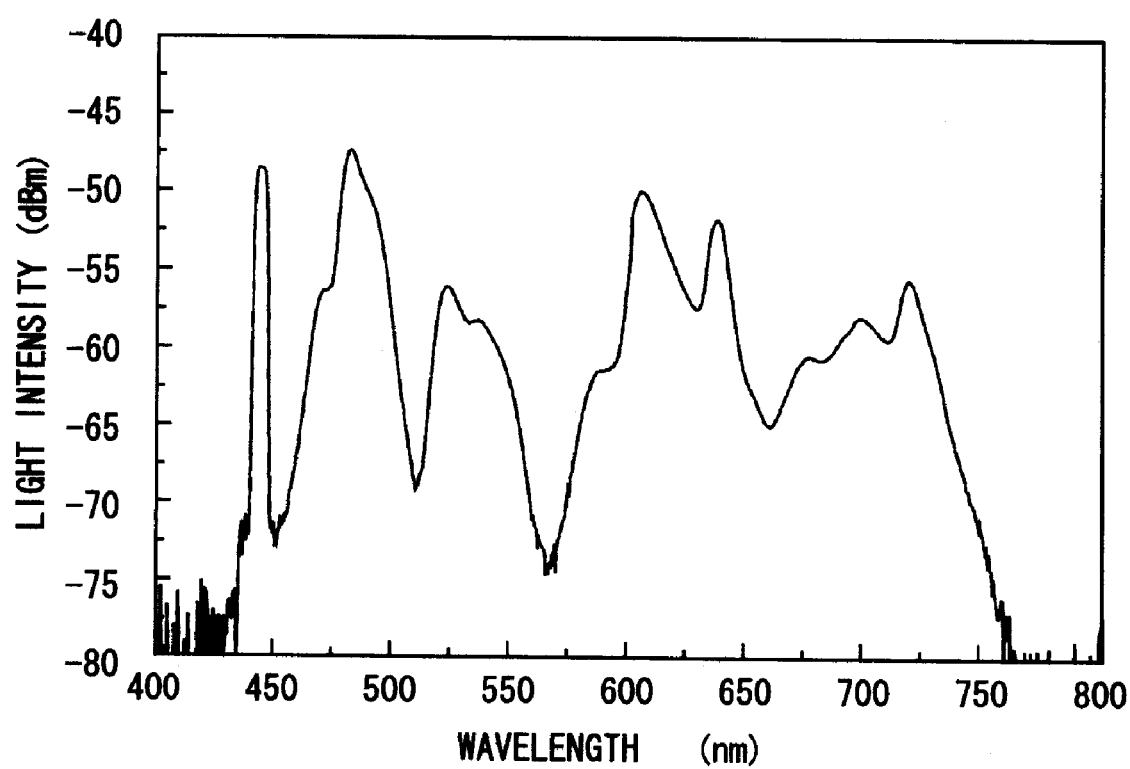
FIG. 4 is a spectrum diagram of an output light emitted from the light-emitting device according to the first embodiment of the present invention.

This experiment was made such that the blue light (its wavelength is 442 nm) "a" was made incident from the blue semiconductor laser element 2 (under the excitation condition of 20 mW) to the fluorescent fiber 3. As a result of the experiment, the white light was observed from the peripheral surface of the fluorescent fiber 3 (the cover member 3C). When the light emitted through the fluorescent fiber 3 was measured, there was observed an emission spectrum having emission wavelength peaks corresponding to the blue light "a" as the excitation light, and the red, green and blue lights as the wavelength conversion lights. The observation results are as shown in the form of a spectrum diagram in FIG. 4. In FIG. 4, an axis of ordinate represents the light intensity, and an axis of abscissa represents a wavelength.

According to the first embodiment as has been described so far, the following effects are obtained.

(1) Since the core 3A of the fluorescent fiber 3 is made of the wavelength-converting member, the components or parts connection for optical coupling between the optical fiber and the wavelength-converting member, which has been conventionally necessary, becomes unnecessary. As a result, the generation of the optical loss due to the components or parts connection can be suppressed, and thus the efficiency of utilizing the light can be enhanced.

(2) Since the lights emitted from the fluorescent fiber 3 contain therein the red, green and blue lights, it is possible to obtain the white light having the excellent color rendering property. Thus, for example, the white light-emitting device of this embodiment is very effectively used as a light source for a backlight for a liquid crystal display panel.

(3) Since the fluorescent fiber 3 is made of the low phonon glass including the fluoride glass which does not contain therein any of $ZrF_4$, $HfF_4$, $ThF_4$ and the like, but contains therein $AlF_3$ as the main constituent, the mechanical strength and chemical durability of the fluorescent fiber 3 are enhanced, and thus the fluorescent fiber 3 can be prevented from being damaged and deteriorated.

Second Embodiment

FIG. 5 is a cross sectional view for explaining a fluorescent fiber of a light-emitting device according to a second embodiment of the present invention.

As shown in FIG. 5, the feature of the light-emitting device (as shown in FIG. 1) 1 shown in the second embodiment is that the light-emitting device 1 includes a fluorescent fiber 50 having a core 50A, a cladding member 50B including a first cladding member 50B-1 which is formed adjacently to the peripheral surface of the core 50A, and a second cladding member 50B-2 which is formed adjacently to a peripheral surface of the first cladding member 50B-1, and a core member 50C.

For this reason, a refractive index n1 of the first cladding member 50B-1 is set to one (n1≈1.48) that is smaller than that n2 (n2≈1.50) of the core 50A, but is larger than that n3 (n3≈1.45) of the second cladding member 50B-2.

According to the second embodiment as has been described so far, in addition to the effects (1) to (3) of the first embodiment, the following effect is obtained.

The first cladding member 50B-1 can be made to function as an optical waveguide. Also, the excitation light "a" introduced into the first cladding member 50B-1 is supplied to the core 50A to generate the wavelength conversion lights including blue, green and red lights.

The construction of the light-emitting device in the second embodiment of the present invention is the same as that of the first embodiment, so that the detailed explanation thereof is omitted here.

While the light-emitting device of the present invention has been described in accordance with the above-mentioned first and second embodiments, it should be noted that the present invention is not intended to be limited to the above-mentioned first and second embodiments. That is to say, the present invention can be implemented in the form of various kinds of aspects without departing the gist thereof. For example, the following changes can be made.

(1) While in the first and second embodiments, the description has been given with respect to the case where the blue light having the wavelength of 442 nm is used as the excitation light "a" emitted from the blue semiconductor laser element 2, the present invention is not limited thereto. That is to say, the blue light may be available as long as it has a wavelength falling within the range of 430 to 490 nm in which it can be used as the excitation light "a" having the high excitation efficiency.

(2) While in the first and second embodiments, the description has been given with respect to the case where a content m of the trivalent praseodymium ions ($Pr^{3+}$) is set to 3000 ppm, the present invention is not limited thereto. That is to say, the content m of the trivalent praseodymium ions may be set to one falling within the range of 100 ppm $\leq m \leq 10{,}000$ ppm. In this case, when the content m is less than 100 ppm, neither of the wavelength conversion lights is obtained within the core 3A. On the other hand, when the content m is more than 10,000 ppm, the light-transmissive property within the core 3A becomes poor.

(3) While in the first and second embodiments, the description has been given with respect to the case where each of the cladding members 3B and 50B is simply made of a glass or a transparent resin containing therein no addition agent, the present invention is not limited thereto. That is to say, the cladding member may contain therein a light diffusion agent as the addition agent. In this case, it is possible to diffuse the excitation light and the wavelength conversion lights into the cladding member, and thus it is possible to more effectively obtain the white light having the excellent color rendering property. In addition, the effect of diffusing the excitation light and the wavelength conversion lights can also be obtained by providing irregularities on the peripheral surface of the cladding member.

(4) While in the first and second embodiments, the description has been given with respect to the case where the blue semiconductor laser element 2 is used as the blue semiconductor light-emitting element, the present invention is not limited thereto. That is to say, even when a blue light-emitting diode element is also used as the blue semiconductor light-emitting element, the same effects as those of the first and second embodiments can be offered.

What is claimed is:

1. A white light-emitting device using a fluorescent fiber, comprising:

a blue semiconductor light-emitting element for emitting an excitation light; and an optical fiber having a first side end face and a second side end face, the excitation light emitted from the blue semiconductor light-emitting element being made incident to the first side end face to be guided to the second side end face, the optical fiber comprising:

a core including a low phonon glass containing therein at least praseodymium ions, as trivalent rare earth ions, for emitting wavelength conversion lights by being excited by the excitation light; and a cladding member having a light emission surface in its peripheral surface, at least a part of optically multiplexed lights, which are obtained by optically multiplexing the wavelength conversion lights and the excitation light, being emitted through the light emission surface, wherein the cladding member of the optical fiber includes a first cladding member formed adjacently to a peripheral surface of the core, and a second cladding member formed adjacently to a peripheral surface of the first cladding member, and a refractive index of the first cladding member is set to one that is smaller than that of the core, but is larger than that of the second cladding member.

2. A white light-emitting device using a fluorescent fiber according to claim 1, wherein:

a content m of the trivalent praseodymium ions is set to a range of 100 ppm$\leq$m$\leq$10,000 ppm.

3. A white light-emitting device using a fluorescent fiber according to claim 1, wherein:

the cladding member of the optical fiber contains a light diffusion agent.

4. A white light-emitting device using a fluorescent fiber according to claim 1, wherein:

irregularities are formed on a peripheral surface of the cladding member of the optical fiber.

5. A white light-emitting device using a fluorescent fiber according to claim 1, wherein:

the blue semiconductor light-emitting element is one selected from a blue light-emitting diode element and a blue semiconductor laser element.

6. A white light-emitting device using a fluorescent fiber according to claim 1, wherein:

the blue semiconductor light-emitting element is a blue semiconductor laser element that emits a laser light having a wavelength falling within a range of 440 to 460 nm.

* * * * *